United States Patent Office 3,703,393
Patented Nov. 21, 1972

3,703,393
ASPHALTIC COMPOSITIONS
Russell E. Koons, St. Louis, Mo., assignor to
Monsanto Company, St. Louis, Mo.
No Drawing. Continuation-in-part of application Ser. No. 711,188, Mar. 7, 1968, which is a continuation-in-part of application Ser. No. 321,360, Nov. 4, 1963. This application Sept. 2, 1970, Ser. No. 69,119
Int. Cl. C08h 13/00, 17/22; C08j 1/46
U.S. Cl. 106—279
10 Claims

ABSTRACT OF THE DISCLOSURE

The softening point and penetration of an air-blown asphalt is increased by mixing the air-blown asphalt with a liquid polyolefin oil having an average molecular weight of 500 to 2,000. The novel compositions can be utilized for various applications such as calking compounds.

CROSS REFERENCE TO RELATED APPLICATIONS

This application is a continuation-in-part of copending application, Ser. No. 711,188, filed Mar. 7, 1968, now abandoned which is a continuation-in-part of Ser. No. 321,360, filed Nov. 4, 1963, now abandoned.

BACKGROUND OF THE INVENTION

The present invention relates to asphaltic compositions. More particularly, the present invention relates to asphaltic compositions comprised of an asphalt and a liquid unsaturated polymeric substance and to a method of preparation for said composition.

Many possible utilizations for asphalt such as calking compounds, linings for irrigation canals and the like require both a high softening point and a high penetration. Such characteristics are rarely found in asphalts, because in most instances as the softening point of an asphalt increases, the penetration decreases. If asphalts are diluted with relatively high molecular weight oils, the penetration is increased but the softening point decreases. Air-blowing of asphaltic materials will generally produce a somewhat higher softening point for a given penetration. However, if a substantial increase in both the softening point and penetration of an asphalt is desired, air-blowing is generally inadequate.

It is an object of the present invention to provide new and novel asphalt compositions. Another object of the present invention is to provide a method for preparing new and novel asphalt compositions. Yet another object of the present invention is to provide a new and novel composition comprised of a particular asphalt and a liquid polyolefin oil. It is also an object of the present invention to provide a method for the preparation of new and novel compositions comprised of a particular asphalt and a liquid polyolefin oil. Additional objects will become apparent from the following description of the invention herein disclosed.

SUMMARY OF THE INVENTION

In fulfillment of these and other objects, it has been found that when liquid polyolefin oils of 500 to 2,000 average molecular weight are admixed with an air-blown asphalt at elevated temperatures, new and novel compositions of asphalt and the liquid polyolefin oils are obtained. These asphaltic compositions possess the unique property of having both a high softening point and a high penetration. Such properties are highly unexpected since the addition of such liquid polyolefin oils to an asphalt would be expected to decrease the softening point.

DESCRIPTION OF PREFERRED EMBODIMENTS

To further describe and to demonstrate the present invention, the following examples are presented. These examples are in no manner to be construed as limiting the present invention.

Example I

A Smackover asphalt (obtained from crude oil from Smackover Field, Ark.), having a penetration at 77° F. of 250 to 270 mm./10 (ASTM Test D5–59T) was air-blown in the presence of 1.9 parts by weight of $P_2O_5$ per 100 parts by weight of asphalt to a softening point of 200° F. (ASTM Test D–36–26) and a penetration at 77° F. of 52 (ASTM Test D5–59T). Approximately 90 parts by weight of this asphalt was admixed with 10 parts by weight of a polypropylene oil having a viscosity of 50 to 70 centipoises at 210° F., a molecular weight of 740 to 900, a refractive index of 1.47 to 1.48, a specific gravity at 60° F. of 0.85 to 0.87 and a flash point of 375° F. C.O.C. minimum. The asphalt-polypropylene oil was stirred for approximately 5 minutes at 325 to 375° F. and then allowed to stand at 325° F. for another 15 minutes. After standing, or aging, the softening point of the asphalt-polypropylene oil composition was found to have increased to 211° F., an increase of 11° F., and the penetration at 77° F. to have increased to 73 mm./10, an increase of 21 mm./10.

Example II

Two Smackover fluxes, one having a 100 to 110 second float at 122° F. (ASTM Test D139–49) and the other a 70 to 90 second float at 122° F., were air-blown in the presence of 1.0 and 0.5 part by weight of $P_2O_5$ per 100 parts by weight of flux, respectively. The two air-blown fluxes were then admixed with the polypropylene oil of Example I in the same quantities and under the same conditions as in Example I. The softening point and penetration of the catalytically air-blown fluxes and the flux-polypropylene oil compositions were as follows:

| Flux | Air-blown flux | | Air-blown flux-polypropylene oil | |
|---|---|---|---|---|
| | S.P. | Pen. | S.P. | Pen. |
| 00–110 sec. float | 184 | 55 | 205 | 69 |
| 70–90 sec. float | 177 | 56 | 200 | 66 |

Two Smackover fluxes, one of 73 second float and the other of 116 second float were non-catalytically air-blown to a softening point of 141 and 223° F., respectively, and a penetration of 66 and 18 mm./10 at 77° F., respectively. These air-blown fluxes were mixed in a 90 to 10 weight ratio with the polypropylene oil of Example I under the conditions of Example I. The results were as follows: With the first flux the softening point increased from 141 to 143° F., while the penetration increased from 66 to 84 mm./10 at 77° F. With the second flux the softening point increased from 223 to 228 and the penetration increased from 18 to 25.

Example IV

A Smackover asphalt flux having a 106 second float was catalytically air-blown in the presence of 3.0 percent by weight of $P_2O_5$ to a softening point of 201° F. and a penetration at 77° F. of 152 mm./10. Approximately 90 parts by weight of this asphalt was admixed with 10 parts by weight of polybutylene oil having an average molecular weight of about 730. The asphalt-polybutylene oil mixture was stirred for approximately 5 minutes at 400° F. and then allow to stand at 325° F. for about 30 minutes. The softening point of the resulting asphalt-polybutylene composition was 218° F. and the penetration at 77° F. was 220 mm./10.

The above four examples are believed to clearly illustrate the present invention. To further illustrate the present invention the following examples are presented to show the results of asphalt-polypropylene mixtures not in accordance with the present invention.

Example V

An unblown Smackover asphalt of a penetration at 77° F. of 88 mm./10 and a softening point of 119° F. was blended with the polypropylene oil of Example I in a weight ratio of 90:10. The mixture was subjected to the conditions of Example I. The mixture had a softening point of 108° F. and a penetration at 77° F. of 147 mm./10. Thus, there was a decrease in softening point and an increase in penetration.

Example VI

The unblown asphalt of Example V was mixed without air-blowing with one percent by weight of $P_2O_5$ and the polypropylene oil of Example I then admixed with the $P_2O_5$ containing asphalt in an asphalt to polymer oil weight ratio of 90:10. The mixture was subjected to the conditions of Example I. Properties of the $P_2O_5$ containing asphalt before and after blending with the polymer oil were as follows:

|  | Before | After |
|---|---|---|
| Softening point, °F | 124 | 113 |
| Penetration, mm./10 at 77 °F | 73 | 121 |

As in Example V, with the increase in penetration, a decrease in softening point was noted.

The asphalts useful in the present invention comprise asphalts and asphaltic materials which may be air-blown. "Asphalt" is used herein in its broadest sense to include not only the materials normally referred to as asphalts, but also the liquid or semi-liquid residues obtained from the destructive distillation of non-asphaltic petroleum, from the distillation of semi-asphaltic and asphaltic petroleums, from the distillation of pressure tar, from the distillation of the residuums resulting from the thermal and catalytic cracking of petroleum, and from the mixing of harder residual asphalts with heavy distillates. As above indicated, the primary requisite of the asphalt or asphaltic material is that it be one which can be air-blown. The preferred asphalts and asphaltic materials are those which can be air-blown to a softening point within the range of from approximately 120 to 300° F. and a penetration at 77° F. of approximately 10 to 200 mm./10. Such preferred asphalts and asphaltic materials are most often asphalt fluxes and the softer asphalts.

Air-blowing of the asphalts or asphaltic materials to produce the asphalts of the present invention is generally by conventional air-blowing techniques. The air-blowing comprises passing air into intimate contact with an asphalt while maintaining the asphalt at elevated temperatures. Air-blowing may take place in the absence or presence of a catalyst. In the practice of the present invention, it is usually preferred that the air-blown asphalt or asphaltic material be a catalytically air-blown material. Generally, the air-blowing catalysts are the stable phosphorus-containing compounds and the metallic salts. The phosphorus-containing compounds are represented by such compounds as the stable acids of phosphorus, i.e., o-phosphoric acid and pyrophosphoric acid, phosphorus pentoxide, red phosphorus and the stable sulfides of phosphorus, i.e., phosphorus sesquisulfide, phosphorus sulfide and phosphorus pentasulfide. The metallic salts are represented by such compounds as ferric chloride, zinc chloride and the like. In practicing the present invention, it is preferred that the air-blown asphalt be one catalytically air-blown in the presence of phosphorus pentoxide. When the air-blown asphalt is one which has been catalytically air-blown, the catalyst is usually allowed to remain in the asphalt.

In catalytically air-blowing the asphalts or asphaltic materials to produce the air-blown asphalts of the present invention, the amount of catalyst used generally is within the range of 0.1 to 4.0 percent by weight of the asphalt-catalyst mixture. However, best results are obtained if the amount of catalyst used in blowing the asphalt is within the range of 0.5 to 3.0 percent by weight of the asphalt-catalyst mixture.

The liquid polyolefin oils useful in preparing the compositions of the present invention include the liquid polymers and co-polymers of oleifins and diolefins. Such liquid polyolefin oils usually have average molecular weights of from 500 to 2,000 and are liquid at ambient temperatures of storage and shipment, including room temperature. A particularly useful group of liquid polyolefin oils are the polyolefin oils of an average molecular weight of 500 to 1,500. The most preferred liquid polyolefin oils for the purposes of the present invention are those of 600 to 1,200 molecular weight and derived from monolefins of 2 to 4 carbon atoms, such as polyethylene oils, polypropylene oils and polybutylene oils. These polyolefin oils are generally produced by the polymerization of olefin hydrocarbons of 2 to 10 carbon atoms in the presence of polymerization catalysts such as Friedel-Crafts catalysts, organo-metallic catalysts, acidic catalysts such as silica-alumina, phosphoric acid and the like.

The amount of liquid polyolefin oils used in the practice of the present invention generally does not exceed 35 percent by weight of the total composition. Above this concentration, the effect of additional polyolefin oils is to lower the softening point while increasing the penetration. Usually, the compositions of the present invention will contain no greater than 30 percent by weight of the liquid polyolefin oil. It is preferred that the amount of polyolefin oil in the present compositions be from 5 to 25 percent by weight of the composition.

The method of preparing the new and novel composition of the present invention comprises intimately mixing an air-blown asphalt and a liquid polyolefin oil at a temperature of 180 to 550° F. Generally, a period of time of 0.5 minute to 6 hours will suffice for the mixing and preparation of the present composition, but more often 1 to 60 minutes is sufficient. The formation of the compositions of the present invention appears to be almost instantaneous upon contact between the air-blown asphalt and the polymeric oil. Therefore, the time necessary for the formation of the compositions of the present invention will vary with the efficiency of mixing. By "mixing" as used above, it is meant merely a thorough and intimate contact between the polymer oil and the asphalt. In many instances, to insure a complete formation of the compositions of the present invention it is desirable to allow the mixed material to stand for 0 to 5 hours at a temperature of 180 to 400° F. after completion of the elevated temperature mixing period. This period, referred to as an "aging" period, is preferably from 0 to 60 minutes at 300 to 400° F.

The preparation of the present compositions may be carried out at subatmospheric, atmospheric or superatmospheric pressures. Since the compositions are readily formed at atmospheric pressure, it will usually be preferred to use such pressure.

The equipment useful in the preparation of the present compositions is not critical. A heating vessel and mixing or agitating device are the basic necessities. Since the preparation may take place in an atmospheric medium, no special means are necessary for maintaining the interior of the heating vessel under an artificial atmosphere.

I claim:

1. A method for increasing the softening point and increasing the penetration of an air-blown asphalt consisting of mixing an air-blown asphalt having a softening point of 120 to 300° F. and a penetration at 77° F. of 10 to 200 mm./10 with a liquid polyolefin oil selected from polypropylene oils and polybutylene oils of an average molecular weight of 500 to 2000 at a temperature of 180° to 550° F. for at least 0.5 minute, said polyolefin oil not exceeding 35 percent by weight of the total mixture.

2. The method of claim 1 wherein the air-blown asphalt is a catalytically air-blown asphalt.

3. The method of claim 2 wherein the air-blowing catalyst is phosphonus pentoxide.

4. The method of claim 1 wherein said liquid polyolefin oil is a polyolefin oil of an average molecular weight of 500 to 1,500.

5. The method of claim 4 wherein said liquid polyolefin oil is a polybutylene oil.

6. The method of claim 4 wherein said liquid polyolefin oil is a polypropylene oil.

7. An asphalt composition of increased softening point and penetration compared to the starting air-blown asphalt consisting essentially of an air-blown asphalt having a softening point of 120 to 300° F. and a penetration at 77° F. of 10 to 200 mm./10 from 5 to 35 percent by weight based on the total composition of a liquid polyolefin oil selected from polypropylene oils and polybutylene oils of an average molecular weight of 500 to 2000.

8. The asphalt composition of claim 7 wherein the liquid polyolefin oil has an average molecular weight of 500 to 1500.

9. The asphalt composition of claim 7 wherein the liquid polyolefin oil is a polypropylene oil.

10. The asphalt composition of claim 7 wherein the liquid polyolefin oil is a polybutylene oil.

References Cited

UNITED STATES PATENTS

| | | | |
|---|---|---|---|
| 2,745,762 | 5/1956 | Soderberg | 106—273 |
| 2,774,724 | 12/1956 | Watson | 260—28.5 AS |
| 2,845,359 | 7/1958 | Edson | 260—28.5 AS |
| 2,909,441 | 10/1959 | Pickell | 106—273 X |
| 2,947,697 | 8/1960 | Vierk | 260—28.5 AS |
| 3,093,610 | 6/1963 | Wurstner | 260—28.5 AS |
| 3,161,610 | 12/1964 | Weisgerber | 260—28.5 AS |
| 3,275,586 | 9/1966 | Wurstner | 260—28.5 AS |
| 3,442,841 | 5/1969 | Adelman | 260—28.5 AS |
| 2,197,461 | 4/1940 | Anderson et al. | 260—28.5 AS |
| 3,418,402 | 12/1968 | Grissom et al. | 106—282 X |
| 3,615,803 | 10/1971 | Draper et al. | 106—280 |

JOAN B. EVANS, Primary Examiner

U.S. Cl. X.R.

106—285; 208—44; 260—28.5 AS